Nov. 7, 1933.　　　H. C. DRAKE ET AL　　　1,933,547
FLAW DETECTOR FOR PIPES
Filed Nov. 12, 1930　　　2 Sheets-Sheet 1
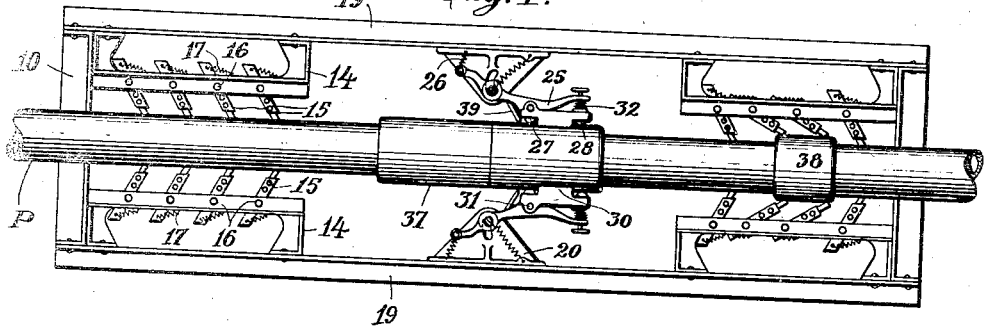
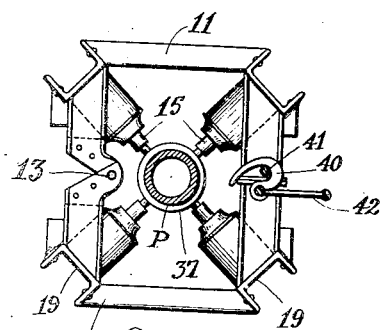
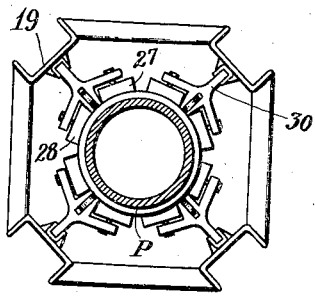
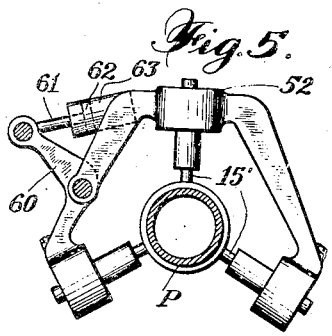
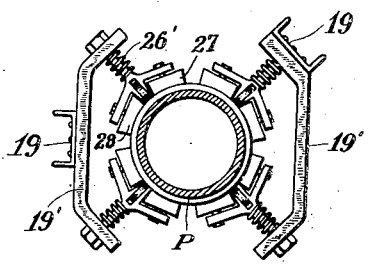
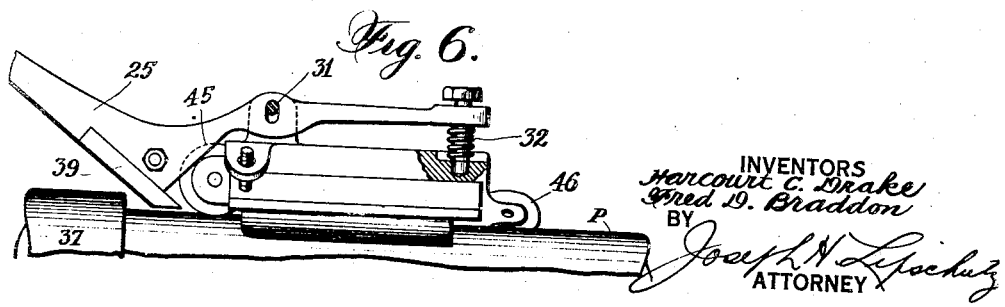
INVENTORS
Harcourt C. Drake
Fred D. Braddon
BY
Joseph H. Lipschutz
ATTORNEY

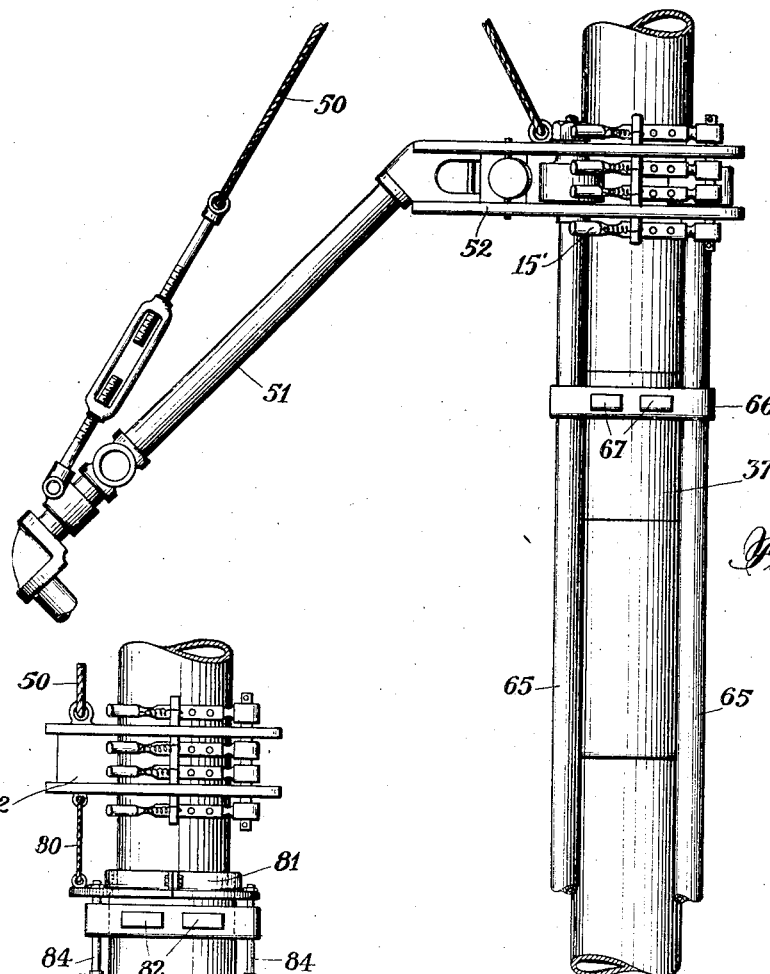
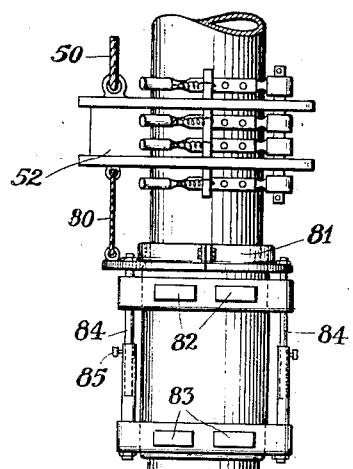
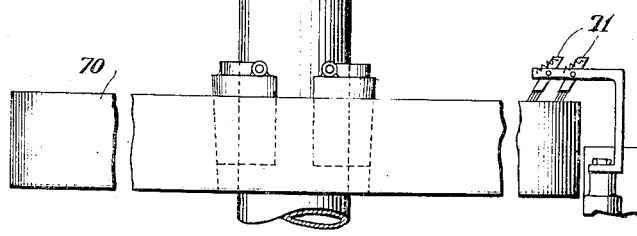

Patented Nov. 7, 1933

1,933,547

UNITED STATES PATENT OFFICE 1,933,547

FLAW DETECTOR FOR PIPES

Harcourt C. Drake, Hempstead, N. Y., and Fred D. Braddon, Los Angeles, Calif., assignors to Sperry Products, Inc., Brooklyn, N. Y., a corporation of New York Application November 12, 1930
Serial No. 495,141

20 Claims. (Cl. 175—183)

This invention relates to means for detecting flaws in oil well drill pipes and in the joints connecting sections of said pipes. It is directed particularly to the design of a suitable supporting structure which may readily be attached to and detached from the pipe and the pipe joints. The principle utilized in this invention is that disclosed in the co-pending application of Elmer A. Sperry, Serial No. 298,771, filed August 10, 1928, in which current is passed through the conductor,—in this case, the pipe or pipe joint—and a set of opposed induction coils is moved through the electromagnetic field thus created so that the flaw which causes a displacement of the current axis, and hence of the electro-magnetic field, will induce a differential E. M. F. which, after being amplified, may be caused to actuate a suitable indicator for indicating the presence of a flaw. In testing oil well drill pipe there is presented not only the problem of providing suitable supports for the current conducting and coil mechanism, but also the problem of effecting a uniform distribution of current through the pipe and of providing detecting means which will cover substantially the entire circumference of said pipe. We provide mechanism for accomplishing all of these results in our invention.

The invention relates further to an adaptation whereby the joints connecting sections of oil well drill pipe may be tested. It is well known that the mud and other materials discharged in the drilling operation often wear a path axially through the threaded portion and soon destroy the coupling as well as render the drilling operation inefficient. This invention provides a suitable rigging and detecting mechanism whereby the detecting mechanism may be quickly applied to those sections of the pipes adjoining a joint and the threaded portion of the joint quickly tested.

Further objects and advantages of this invention will become apparent in the following detailed description.

In the accompanying drawings,

Fig. 1 is a side elevation of a section of oil well drill pipes and connected joint showing one form of our invention, adapted for testing the drill pipe proper, applied thereto.

Fig. 2 is an end view of the device shown in Fig. 1.

Fig. 3 is a section taken through the detector coil mechanism and the respective mountings, as shown in Fig. 1.

Fig. 4 is a view similar to Fig. 3 of a modified form of coil mounting.

Fig. 5 is a view similar to Fig. 2, but showing a modified form of brush support.

Fig. 6 is an enlarged view, partly sectioned, of one of the coil carriages of Figs. 2 and 3.

Fig. 7 is a front elevation of a form of the invention especially adapted for pipe joint testing.

Fig. 8 is a view similar to Fig. 7 of a modified form of pipe joint tester.

Referring to Figs. 1 and 2 of the drawings, it will be observed that the entire detector equipment is carried by a frame 10 comprising two sections 11, 12, pivoted on axis 13 so that said frame may be opened up and applied to or detached from the oil well drill pipe P. Said frame comprises main braces 19 carrying brackets 14, which in this case are shown as four in number, but which may be any number sufficient to support enough brushes 15 to distribute the current equally through the pipe. In this instance each bracket is shown as carrying a plurality of current conducting brushes, each of which is pivoted on the bracket at 16 and normally pressed towards engagement with the pipe by means of springs 17. Current is led into the pipe by the sets of brushes at one end of the frame and, after passing through the pipe, leaves the same through the sets of brushes at the other end of said frame. Intermediate the said sets of brushes are positioned a plurality of brackets 20 fixed to the main braces 19 of the frame, each bracket carrying a pivotally supported carriage 25 normally pressed by a spring 26 towards engagement with the pipe. The other end of the carriage supports two sets of opposed detector coils 27 and 28, one on each side of a separating fin 30. Each set of coils is in the form of a pick-up unit pivoted on the carriage at 31 and spring-pressed towards engagement with the pipe by springs 32. Each set of opposed coils covers a different area of the pipe and a sufficient number of brackets supporting a sufficient number of carriages are fixed to the main support braces of the frame so that substantially the entire periphery of the pipe is covered by said sets of coils. The rear end of each carriage will engage the pipe first as the frame is applied to the pipe and be pressed into engagement with the pipe against the action of the springs 26, until the forward end of the carriage is brought into engagement with the pipe and pressed thereagainst, thus placing the forward springs 32 also under compression.

Since all of the brushes as well as all of the coil-carrying carriages are normally pressed towards the pipe by springs, the two parts 11, 12 of the main frame 10 will be held open by such spring pressure when first applied to the pipe and must be brought together by the expenditure of a certain amount of force, which in this case may take the form of a cam hook 40 pivoted on one of the frame parts and engaging over a pin 41 on the other part, the said hook being operated by means such as a handle 42. If desired, a steam cylinder, such as that employed in Fig. 5, or electro-magnet (not shown) may be provided for effecting the said closure in place of the cam hook. The locking of the two parts of the frame will thus compress all of the brush springs and coil carriage springs to hold all of said members in firm engagement with the drill pipe. The spring pivot mounting of the brushes and the carriages enables said brushes and carriages to ride over the joint coupling and the rubber washers which protect said couplings.

The details of the coil-carrying carriage are disclosed in the enlarged view shown in Fig. 6 and include an inclined face 39 which is designed to strike the joint coupling as the said pipe is moved along and thus take the blow incident to such contact. The engagement of said contact face with the coupling will serve to lift the entire carriage and thus allow the wheels 45, 46 at the opposite ends of the carriage to ride over said joint coupling.

It will be seen from the above description that we have provided a suitable rigging which can be easily applied to or detached from the pipe, and also a suitable arrangement of brushes and detector coils so that the entire circumference of the pipe may be tested in a single operation without the necessity of rotating the pipe, and also suitable means have been provided whereby the brushes and carriages may remain effective in spite of the necessity of riding over joint couplings 37 and protective washers 38. The number of brushes carried by each bracket is such that when riding over the insulating rubber cushions 38, at least two brushes will always be in contact with the pipe to effect good electrical contact with said pipe. The rigging is designed to be hoisted by means of the derrick which is already in place at the oil well, so that it can be easily raised and lowered.

In Fig. 4 we have shown a slightly modified form of mounting for the detector coils, the same number of coils being shown, but instead of each two sets of coils being carried by a bracket fixed directly to the supporting frame, two adjoining carriages are mounted on a bracket 19' which is then fixed to one of the main ribs 19 of the supporting frame. The coils are pressed into engagement with the pipe by springs 26', similar in their action to springs 26.

In Fig. 5 we have disclosed a slightly modified form of frame which, instead of forming a complete closure around the pipe, takes the form of a three-sided enclosure with three sets of brushes 15' spaced around the circumference of the pipe, one of said sets of brushes being adapted to be swung outwardly so that the entire frame may be readily withdrawn from or applied to the pipe. The pivoted brush holder is shown as carried by a bell crank 60, the other arm of which is connected with a piston rod 61 operated by a piston 62 in a steam chest 63, or, if desired, it may be operated by an electro-magnet or any other suitable motive means.

While the above arrangement is designed particularly for use in connection with the main portions of the drill pipe, it may also be used to test the threaded portions of the joint coupling in the case where the pipe is not rotated.

Where, however, the pipe is rotated, as is the case when the pipe sections are being withdrawn, there may be employed the following structure for testing the threaded portions of the joint couplings. This structure may include a main supporting frame 51, carrying at its upper and lower ends sets of brushes similar to those shown in Fig. 5 and supported in brackets 52, said brackets being spaced apart a distance sufficient to engage the drill pipe proper at points above and below the joint coupling 37. Said brackets may be spaced apart by suitable parallel supporting rods 65, which may be of brass, on which slides vertically a coil carriage 66 carrying the detector coils 67. Said coils may be moved slowly downwardly to test the threaded portion at one end of the coupling as the said pipe and coupling rotate and may then be slid further down along said guide rods to test the threaded portion at the other end of the joint coupling. The entire structure may be swung away from the pipe by means of cables 50 extending over the derrick and engaging frame 51.

A modification of the form shown in Fig. 7 is disclosed in Fig. 8, wherein the pipe to be tested is supported on the turntable 70. Current is supplied by brushes 71 engaging the table while but one bracket 52 is employed for the other set of brushes. The bracket may be suspended from the derrick by cable 50, and the detector mechanism may be suspended from the bracket as by means of a cable 80 supporting a detachable collar 81 designed to rest on the shoulder of the joint. The detector coils 82, 83 may be supported from the collar 81 by means of adjustable rods 84, the adjustment 85 permitting the coils to be positioned properly with respect to the portions of the threaded joint which it is desired to test. While two sets of coils are shown, a single set may be employed, as in the Fig. 7 form. In the Fig. 8 form of the invention the bracket 52 constitutes the supporting frame.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. A device for detecting flaws in pipes by the method of passing current through the pipe by means of current conducting brushes and detecting variations in the electro-magnetic field surrounding the pipe by means of opposed induction coils, comprising a frame detachably mounted on said pipe, said frame comprising a plurality of relatively movable sections carrying said brushes and said coils, said brushes being so disposed as to engage the pipe at a plurality of points around the circumference thereof.

2. A device for detecting flaws in pipes by the method of passing current through the pipe by means of current conducting brushes and detecting variations in the electro-magnetic field surrounding the pipe by means of opposed induction coils, comprising a frame detachably mounted on said pipe to enclose the same, said frame comprising a plurality of relatively movable sections, each of said sections carrying certain of said brushes and said coils.

3. A device for detecting flaws in pipes by the method of passing current through the pipe by means of current conducting brushes and detecting variations in the electro-magnetic field surrounding the pipe by means of opposed induction coils, comprising a frame detachably mounted on said pipe, said frame comprising a plurality of relatively movable sections, each of said sections carrying certain of said brushes and said coils, said brushes being so disposed as to provide substantially uniform distribution of current through the pipe circumference.

4. A device for detecting flaws in pipes by the method of passing current through the pipe by means of current conducting brushes and detecting variations in the electro-magnetic field surrounding the pipe by means of opposed induction coils, comprising carriages for supporting said coils, a frame detachably mounted on said pipe, said frame comprising a plurality of relatively movable sections carrying said brushes, and said carriages, said brushes and said carriages being so disposed as to engage the pipe at a plurality of points around the circumference thereof.

5. A device for detecting flaws in pipes by the method of passing current through the pipe by means of current conducting brushes and detecting variations in the electro-magnetic field surrounding the pipe by means of opposed induction coils, comprising a frame detachably mounted on said pipe, said frame carrying said brushes, said coils and carriages supporting said coils, said brushes being so disposed as to provide substantially uniform distribution of current through the pipe circumference, and said carriages being so disposed as to co-act with substantially the entire circumference of said pipe.

6. A device for detecting flaws in pipes by the method of passing current through the pipe by means of current conducting brushes and detecting variations in the electro-magnetic field surrounding the pipe by means of opposed induction coils, comprising a frame, said frame pivotally connected sections whereby the frame may be attached to or detached from said pipe, said sections carrying said brushes and said coils.

7. A device for detecting flaws in pipes by the method of passing current through the pipe by means of current conducting brushes and detecting variations in the electro-magnetic field surrounding the pipe by means of opposed induction coils supported in carriages, said device comprising a frame, said frame comprising pivotally connected sections whereby the frame may be attached to or detached from said pipe, said brushes and said carriages being pivotally mounted on said sections.

8. A device for detecting flaws in pipes by the method of passing current through the pipe by means of current conducting brushes and detecting variations in the electro-magnetic field surrounding the pipe by means of opposed induction coils supported in carriages, said device comprising a frame, said frame comprising pivotally connected sections whereby the frame may be attached to or detached from said pipe, said brushes and said carriages being pivotally mounted on said sections, and springs for pressing said brushes and said carriages into engagement with said pipe.

9. A device for detecting flaws in pipes by the method of passing current through the pipe by means of current conducting brushes and detecting variations in the electro-magnetic field surrounding the pipe by means of opposed induction coils supported in carriages, said device comprising a frame, said frame comprising pivotally connected sections whereby the frame may be attached to or detached from said pipe, said brushes and said carriages being pivotally mounted on said sections, springs for pressing said brushes and said carriages into engagement with said pipe, said spring pressure being sufficient to hold said sections apart, and means for locking said sections against said spring pressure.

10. A device for detecting flaws in oil well drill pipes, having pipe sections joined by couplings and having insulating protector rings for said couplings, by the method of passing current through the pipe by means of current conducting brushes and detecting variations in the electro-magnetic field surrounding the pipe by means of opposed induction coils supported in carriages, said device comprising a frame, said brushes and said carriages being pivotally mounted on said frame to ride over said couplings and rings, springs for pressing said brushes and said carriages into engagement with said pipe, a plurality of brushes being arranged axially of the pipe so that certain of said brushes will always engage the pipe while the remaining brushes ride over said rings as the pipe is moved through the frame.

11. A device for detecting flaws in oil well drill pipes, having pipe sections joined by couplings and having insulating protector rings for said couplings, by the method of passing current through the pipe by means of current conducting brushes and detecting variations in the electro-magnetic field surrounding the pipe by means of opposed induction coils supported in carriages, said device comprising a frame, said brushes and said carriages being pivotally mounted on said frame to ride over said couplings and rings, springs for pressing said brushes and said carriages into engagement with said pipe, a plurality of brushes being arranged axially of the pipe so that at least two brushes will always engage the pipe while the remaining brushes ride over said rings as the pipe is moved through the frame.

12. A device for detecting flaws in oil well drill pipes having pipe sections joined by couplings and having insulating protector rings for said couplings, by the method of passing current through the pipe by means of current conducting brushes and detecting variations in the electro-magnetic field surrounding the pipe by means of opposed induction coils supported in carriages, said device comprising a frame, said brushes and said carriages being pivotally mounted on said frame to ride over said couplings and rings, springs for pressing said brushes and said carriages into engagement with said pipe, said carriages having cam faces to engage said couplings and lift the coils as the pipe is moved through the frame.

13. A device for detecting flaws in the joint couplings of oil well drill pipes by the method of passing current through the pipe by means of current conducting brushes and detecting variations in the electro-magnetic field surrounding the pipe by means of opposed induction coils, said device comprising a support, brush holders on said support adapted to engage the pipe at points above and below the coupling, and means whereby said coils are movably mounted on said support to co-act with the coupling.

14. A device for detecting flaws in the joint couplings of oil well drill pipes by the method of passing current through the pipe by means of current conducting brushes and detecting variations in the electro-magnetic field surrounding the pipe by means of opposed induction coils, said device comprising a support, brush holders on said support adapted to engage the pipe at points above and below the coupling, and means whereby said coils are slidably mounted on said support for axial movement with respect to said coupling.

15. A device for detecting flaws in the joint couplings of oil well drill pipes by the method of passing current through the pipe by means of current conducting brushes and detecting variations in the electro-magnetic field surrounding the pipe by means of opposed induction coils, said device comprising a support, brush holders on said support adapted to engage the pipe at points above and below the coupling, and guide rods between the upper and lower brush holders, said coils being slidably mounted on said rods to co-act with the coupling.

16. A device for detecting flaws in the joint couplings of oil well drill pipes by the method of passing current through the pipe by means of current conducting brushes and detecting variations in the electro-magnetic field surrounding the pipe by means of opposed induction coils, said pipe being supported at one end in a turn-table, said device comprising a support, and means for passing current through said coupling comprising brushes carried by said support and brushes engaging said turn-table.

17. A device for detecting flaws in the joint couplings of oil well drill pipes by the method of passing current through the pipe by means of current conducting brushes and detecting variations in the electro-magnetic field surrounding the pipe by means of opposed induction coils, said pipe being supported at one end in a turn-table, said device comprising a support, means for passing current through said coupling comprising brushes carried by said support and brushes engaging said turn-table, and a plurality of detector coils carried by said support.

18. A device for detecting flaws in the joint couplings of oil well drill pipes by the method of passing current through the pipe by means of current conducting brushes and detecting variations in the electro-magnetic field surrounding the pipe by means of opposed induction coils, said pipe being supported at one end in a turn-table, said device comprising a support, means for passing current through said coupling comprising brushes carried by said support and brushes engaging said turn-table, a collar carried by said support and adapted to engage the shoulder of the coupling, and a plurality of detector coils supported by said collar.

19. A device for detecting flaws in the joint couplings of oil well drill pipes by the method of passing current through the pipe by means of current conducting brushes and detecting variations in the electro-magnetic field surrounding the pipe by means of opposed induction coils, said pipe being supported at one end in a turn-table, said device comprising a support, means for passing current through said coupling comprising brushes carried by said support and brushes engaging said turn-table, a collar carried by said support and adapted to engage the shoulder of the coupling, and a plurality of detector coils supported by said collar in fixed relation to said coupling.

20. A device for detecting flaws in pipes by the method of passing current through the pipe by means of current conducting brushes and detecting variations in the electromagnetic field surrounding the pipe by means of opposed induction coils, comprising a frame detachably mounted on said pipe, said frame comprising a plurality of sections relatively movable to effective position to grip the pipe and to ineffective position to release the same, said brushes and said coils being so mounted on said frame that movement of said sections to effective position causes said brushes to engage the pipe.

HARCOURT C. DRAKE.
FRED D. BRADDON.